April 16, 1968 R. GOTTSCHALD 3,378,286
BALL JOINTS
Filed Sept. 7, 1966
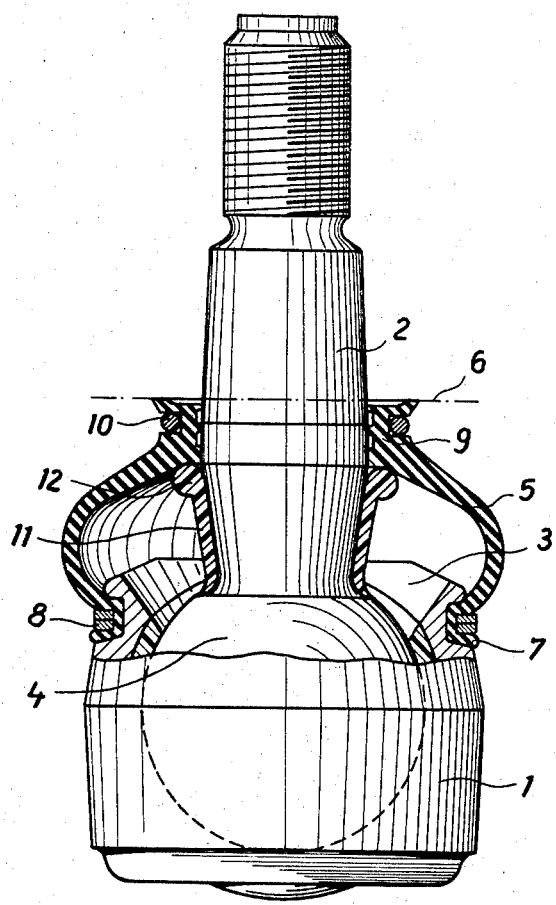
Inventor
Rudolf Gottschald
Schlesinger, Arbright & Garry
ATTORNEYS 3,378,286
BALL JOINTS
Rudolf Gottschald, Osterath, Germany, assignor to
Messrs. A. Ehrenreich & Cie
Filed Sept. 7, 1966, Ser. No. 577,697
Claims priority, application Germany, Aug. 2, 1966,
E 32,187
4 Claims. (Cl. 287—87)

ABSTRACT OF THE DISCLOSURE

A universal ball-and-socket joint with a joint housing and a pin positioned inside the housing over a ball end; the outlet opening of the joint housing is closed off by a bellows which, on the one hand, is fastened to the joint housing and which, on the other hand, connects to the shaft of the joint pin in a manner providing sealing action, though still permitting the pin to be rotated. Inside the bellows, the joint pin is surrounded by a sleeve made of elastic material, one end of the sleeve resting against the ball end and the other end, provided with a contact surface, resting on the inside, against the edge of the bellows opening that adjoins the joint pin to prevent slipping.

---

My invention relates to a ball joint, and more particularly to a ball joint as it is used with motor vehicles, comprising a joint case and a point pin said joint pin being supported by means of a ball head in said joint case so that it may move in any direction and said joint case having an opening for the passage of the joint pin, for which passage there has been provided a packing in the form of bellows which is made from an elastic material and passed by the joint pin, one rim of said packing being fixed with a sealing effect to the joint pin while the other rim is in tight contact with the joint case.

Ball joints of the type as described above are liable to be subject to the risk that the bellows packing is gliding on the joint pin towards the joint case and that the same is wedged and crushed by the angular deflections of the joint pin.

It is already known to provide the bellows packing with a socket which projects against the ball head surrounding the joint pin. Said socket can prevent the packing from gliding towards the joint case and the ball head but imperfectly, because there is the danger that the socket in which the joint pin must be able to turn, is breaking, due to distortions occurring between the bellows and the socket in the case of major angular deflections, at the bellows in which event the desired tightness ceases to exist.

In order to improve the tightness the ball joint packings in the form of a cap it has been suggested to design that part of the cap which is in contact with the joint pin, as a turn-up projecting into the cap at the interior cap rim on the cap side not facing the joint case, in order to achieve a major surrounding surface at the joint pin which is intended to guarantee perfect tightness at the joint pin and to result in an elastic stop in the case of angular movements of the joint pin. In said cap packings the cap is following the movements of the joint pin. The projecting turn-up of the rim as described above is, however, not suitable for bellows packing.

The principal object of the present invention is to provide a ball joint, in particular a ball joint comprising a bellows packing, in such a way that gliding of the packing bellows against the joint case and dislocation of the packing bellows after insertion of the ball joint cannot take place and reliability of the desired packing is not impaired.

In the first line, this problem has been solved, according to the present invention, by providing a socket on the joint pin inside the packing which socket projects from the surrounding zone of the joint pin by the packing after insertion of the joint towards the ball head against the packing said socket being separate from the packing, rigidly attached on the joint pin and preferably consisting of a caoutchouc elastic plastic material, particularly of Vulkollan (brand name registered by Farbenfabriken Bayer).

According to this solution the ball joint is provided with a distance piece or a packing support which does not exert any influence on the desired tightness and does not have any retroactive effects on the packing in the case of rotary and angular movements of the joint pin since the distance piece is following all movements of the joint pin without distortion of the packing and does not need to participate in sealing the joint case. At the same time, an elastic stop, in the case of angular movements of the joint pin, is achieved by said distance piece. The socket is able, due to its elasticity, to adjust itself to the bellows and to compensate distance tolerances between the bellows rim of the built-in joint and the ball head.

It is recommended to reinforce the socket rim extending against the packing rim surrounding the joint pin to form an exterior bead or similar.

This will result in a larger contact surface of the packing rim to the socket which increases safety of the distance piece effect and, in addition, improves the sealing effect, since the bead, in a way, is a reinforcement in front of the packing rim surrounding the joint pin.

Summary

The invention comprises a ball-and-socket joint having a bellows-like means with a larger opening connected to the joint housing and a smaller opening connected to the joint pin. A sleeve tightly surrounds the pin joint and there is means provided, including a flange to prevent the slipping of the bellows-like means over and down the joint pin.

The drawing is an example of a construction according to the present invention showing an elevational view and a partial longitudinal section of a ball joint.

The joint case has been identified by 1 and the joint pin by 2. The opening of the joint case for the passage of the joint pin has been defined by 3, the ball head of the joint pin by 4.

A bellows packing 5 has been provided for sealing the opening of the joint case for the passage of the joint pin. In the drawing the bellows packing has been shown in the position which it will have after insertion of the joint pin into the lever eye marked by a line 6 consisting of dots and dashes.

The bellows packing is attached to the outside of the joint case for which purpose it engages with its rim 7 facing the joint case into an exterior groove of the joint case. The rim is fixed, for instance, in said groove by means of the annular springs 8. The other rim 9 of the bellows closely surrounds the joint case. Its contact against the joint pin has been increased by means of the annular spring 10.

Within the bellows a distance socket 11 or support socket made from an elastic material, preferably from caoutchouc elastic plastic material and in particular from Vulkollan (brand name registered by Farbenfabriken Bayer), has been provided on the joint pin. The distance socket is rigidly attached to the joint pin and is turning together with the latter. The socket extends from the ball head 4 to the bellows rim surrounding the joint pin after the joint pin has been built in into the lever eye or similar. On the outside the socket rim in contact with the bellows rim 9 has been reinforced to form a bead 12 or a flange.

I claim:

1. A ball and socket joint, comprising a cup shaped joint housing, a ball end connected to a joint pin positioned in said joint housing so that said ball end is movable therein, said housing having an outlet opening for said joint pin, said opening being closed off by a bellows-like means having larger and smaller openings, and through which said joint pin penetrates, said bellows-like means being fastened at said larger opening to the edge of the joint housing and said smaller opening against the shaft of said joint pin so as to provide a sealing effect, although still permitting rotation, a sleeve means extending inside said bellows-like means and tightly surrounding said joint pin, said sleeve means being made of elastic material, one end of said sleeve means resting against said ball and its other end resting against the inside of the edge of said smaller opening of said bellows-like means which surrounds the shaft of said pin, one of said means having a flange portion thereon co-operating with said other means so as to increase the surface contact area therebetween to prevent one of said means from slipping over the other of said means.

2. A ball and socket joint as defined in claim 1 wherein said sleeve has a contact surface including said flange abutting said smaller opening.

3. A ball and socket joint as defined in claim 1 including spring means for securing said bellows-like means to said housing.

4. A ball and socket joint as defined in claim 1 including spring means for securing said bellows-like means to said joint pin.

References Cited

UNITED STATES PATENTS

| | | | |
|---|---|---|---|
| 2,107,090 | 2/1938 | Swennes | 74—18.1 XR |
| 2,354,831 | 8/1944 | Rike | 74—18.2 |
| 2,752,180 | 6/1956 | Vogt | 287—87 |
| 2,921,809 | 1/1960 | Kogstrom | 287—90 |
| 3,025,090 | 3/1962 | Langen | 287—87 |
| 3,155,407 | 11/1964 | Gottschald | 287—87 |
| 3,269,758 | 8/1966 | Ulderup et al. | 287—87 |

FOREIGN PATENTS

| | | |
|---|---|---|
| 556,965 | 10/1943 | Great Britain. |
| 953,861 | 12/1956 | Germany. |
| 635,612 | 3/1962 | Italy. |

EDWARD C. ALLEN, *Primary Examiner.*

ANDREW KUNDRAT, *Assistant Examiner.*